Jan. 19, 1971       J. W. HOLZMAN       3,555,893
LATERAL AND STEERING FORCE INDUCING MECHANISM
Filed Sept. 25, 1968                    3 Sheets-Sheet 1
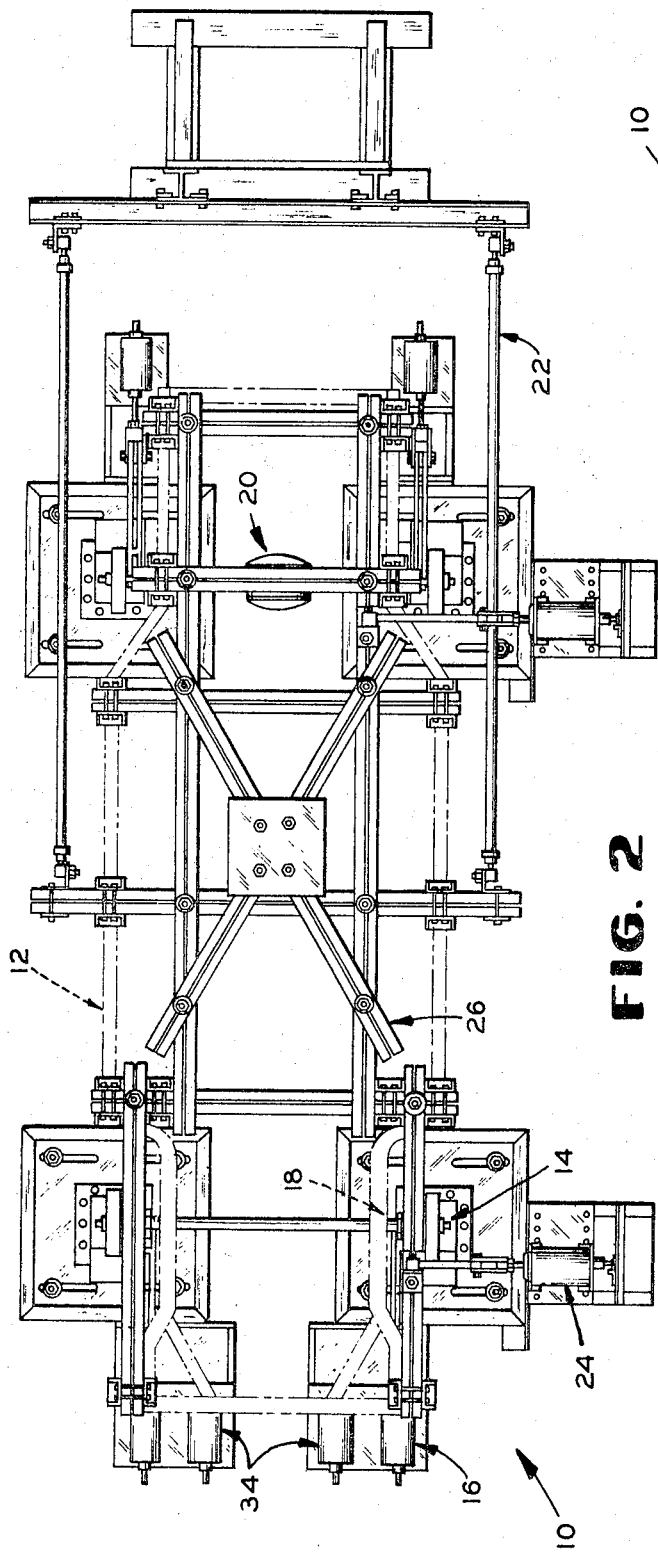
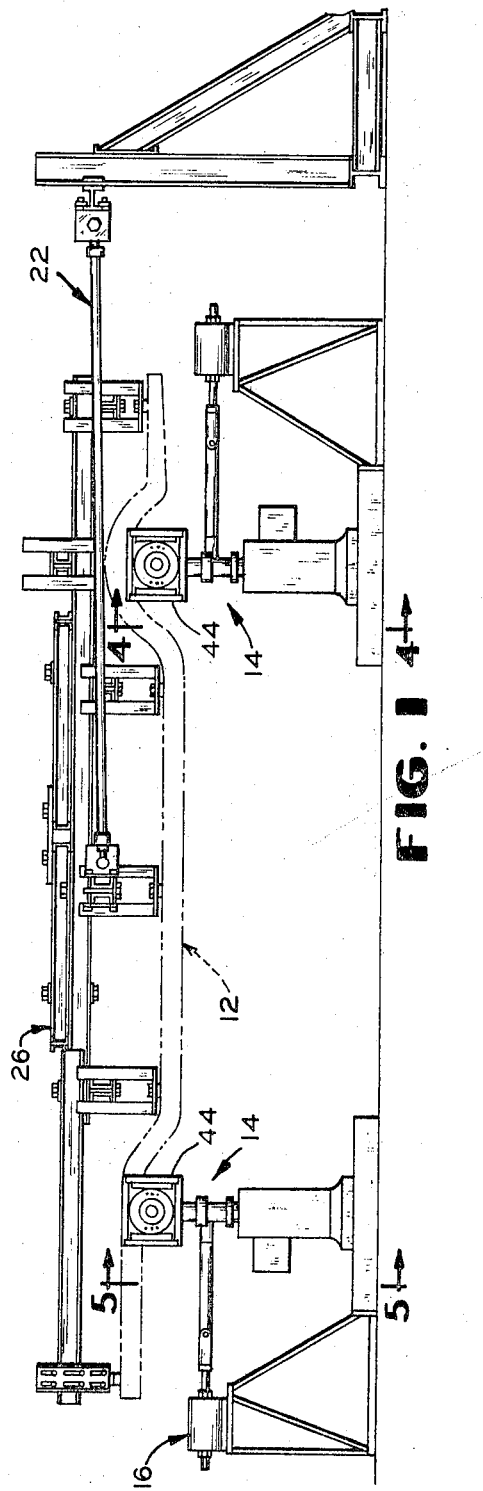
INVENTOR.
JAMES W. HOLZMAN
BY
ATTORNEY

INVENTOR.
JAMES W. HOLZMAN
BY
ATTORNEY

Jan. 19, 1971  J. W. HOLZMAN  3,555,893
LATERAL AND STEERING FORCE INDUCING MECHANISM
Filed Sept. 25, 1968  3 Sheets-Sheet 3

INVENTOR.
JAMES W. HOLZMAN
BY
ATTORNEY

United States Patent Office 3,555,893
Patented Jan. 19, 1971

3,555,893
LATERAL AND STEERING FORCE INDUCING MECHANISM
James W. Holzman, Grosse Ile, Mich., assignor to Dana Corporation, Toledo, Ohio, a corporation of Virginia
Filed Sept. 25, 1968, Ser. No. 762,466
Int. Cl. G01m 5/00
U.S. Cl. 73—71.7    9 Claims

ABSTRACT OF THE DISCLOSURE

This invention provides a means for producing simulated road induced lateral displacement to a vehicle frame under test and also provides for the simulation of steering forces for this same test frame.

---

Normally, when a vehicle encounters road surfaces which cause "tramp," that is to say, a road surface such that the right and left wheels are raised and lowered alternately or out-of-phase, or when one wheel strikes a bump or hole while its paired opposite wheel does not, then as the one wheel is raised or lowered, the whole vehicle including the frame tends to rotate about the point at which the opposite wheel touches the road surface. It can be easily shown geometrically that this causes both a vertical and lateral movement of the vehicle and its frame. When this happens at any normal operating speed lateral "shake" is produced in the vehicle frame structure. And, of course, this causes vehicle deterioration and possible eventual failure of its components.

At the same time, any vehicle, during its movement along a road surface, requires steering to negotiate curves and bends in the road or highway. This also produces a force which is imparted to the vehicular frame which also contributes to its eventual deterioration and possible failure.

In a typical road simulation in the laboratory for frame testing, as shown for example in my co-pending application Ser. No. 594,072, filed on Nov. 14, 1966 and entitled "Dynamic Road Simulator," issued Aug. 5, 1969 as U.S. Pat. No. 3,459,037, when recorded tramp inputs occur vertical oscillation) the tendency is for the vehicle frame structure to rotate about its own longitudinal mass center since there is no actual wheel contact with the road surface. This subsantially reduces the lateral shake element forces to approximately one-half the normal force which would be expected if the vehicle frame was traversing a road or highway. Additionally, typical frame testing road condition simulation in the laboratory has not yet provided a means for imparting the expected steering forces which would be actually occasioned on a road to a vehicular frame. Accordingly, it would be very advantageous to the vehicular frame testing process if a mechanism or apparatus could be provided which would impart to the frame, under test, actual tramp input values insofar as the lateral shake portion thereof is concerned and also would impart to the same vehicular frame those forces occasioned by the necessary and expected steering of an actual vehicle.

It is, therefore, an object of this invention to provide a means for testing a vehicle frame which simulates correctly, and properly induces, the lateral shake forces which would be occasioned during vehicle traverse over a road or highway.

It is an additional object of this invention to provide an apparatus for testing a vehicle frame which will induce in the frame the forces incident to operation of a vehicle steering mechanism.

It is a further object of this invention to provide a means for inducing lateral shake forces through a rigid axle and lateral shake forces through an independent suspension system.

It is a still further object of this invention to provide a means for inducing lateral shake forces through an independent suspension system.

Further objects and advantages will become apparent on the reading of the following specification taken together with the accompanying drawings which form a part thereof.

In accordance with the objects of the invention a dynamic testing machine such as is described in my aforementioned co-pending application is provided with the subject matter forming this invention. This dynamic testing machine has mounted thereon a vehicular frame including its front wheel independent suspension system, rear axle and rear axle suspension mounting means. The rear axle and independent suspension system are supported by a vertically reciprocating means which provides for the simulation of the vertical forces inherent in "hop" and "tramp" loading. This vertically reciprocating means includes a series of four vertical reciprocating elements situated approximate the wheel locations of the vehicle frame. Each of these reciprocating elements is attached to the vehicle wheel or axle ends through a fixture capable of universal rotary motion and transverse and longitudinal sliding motion so that the axle and wheel ends are free to deflect movingly upon vertical, torque, cornering, inertia, steering or lateral "tramp" and "hop" loads being placed on the vehicular frame. Mounted inboard of the vertically reciprocating means and directly attached to the axle or wheel end portions is a longitudinal reciprocating torsional load applying means. An acceleration and deceleration inertia simulating means is also provided and is attached to the vehicular frame at its longitudinal pitch axis and a body simulating means is mounted on the vehicle frame to properly preload it. Cornering or centrifugal loads are imposed on the vehicular frame through connection of such a means with the body simulating means.

The just described dynamic testing machine is modified and improved by the addition of a steering force imposing means and an additional means for imposing lateral hop and tramp induced forces for both the front and rear of the vehicle frame. The steering force imposing means is disposed in parallel position to the torsion imposing means and acts against the independent suspension system while the lateral force inducing means is connected to the vehicular frame below and substantially at its longitudinal axis.

A better understanding of the invention can be had by reference to the drawings which form a portion of the specification and wherein;

FIG. 1 is a view in elevation of the dynamic test machine with the cornering loading simulating means and lateral force inducing means removed and snowing the attached frame in the position of the test.

FIG. 2 is a plan view of the structure shown in FIG. 1 with the cornering loading simulating means and portions of the lateral force inducing means added and taken generally on line 2—2;

Figure 3:
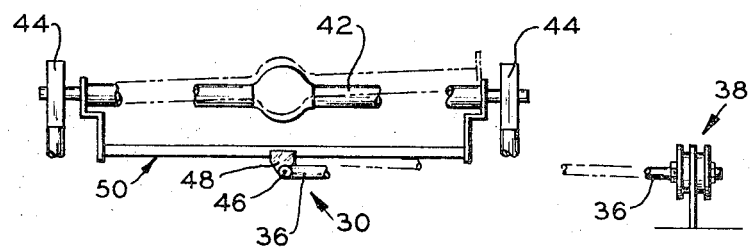
FIG. 3 is a generally schematic view in elevation of a typical rigid axle and the lateral force inducing means for such an axle.

Referring now more particularly to FIGS. 1 and 2, a testing machine assembly 10 having a vehicular frame 12 mounted thereon is arranged so that the testing machine supports the entire vertical load of the frame 12 on a vertically reciprocating means 14 that simulates the vertical "hop" and vertical "tramp" phenomenon of a moving vehicle. A torsion applying means 16 is attached to the front suspension system 18 of the vehicle frame and the rear axle 20 of the vehicle frame. An acceleration and deceleration inertia simulating means 22 is attached to the vehicle frame 12 to thereby provide a reacting force against torsional application. A corner simulating means 24, reciprocatory in nature, is attached to a body simulating assembly 26 formed from a frame of adjustably joined structural members. The testing machine assembly, insofar as related, is very similar to the testing machine apparatus as disclosed in my co-pending application, Ser. No. 594,072, filed on Nov. 14, 1966 and entitled, "Dynamic Road Simulator." Reference may be had to that application for a more thorough knowledge of the foregoing portion of the testing machine 10.

Figure 4:
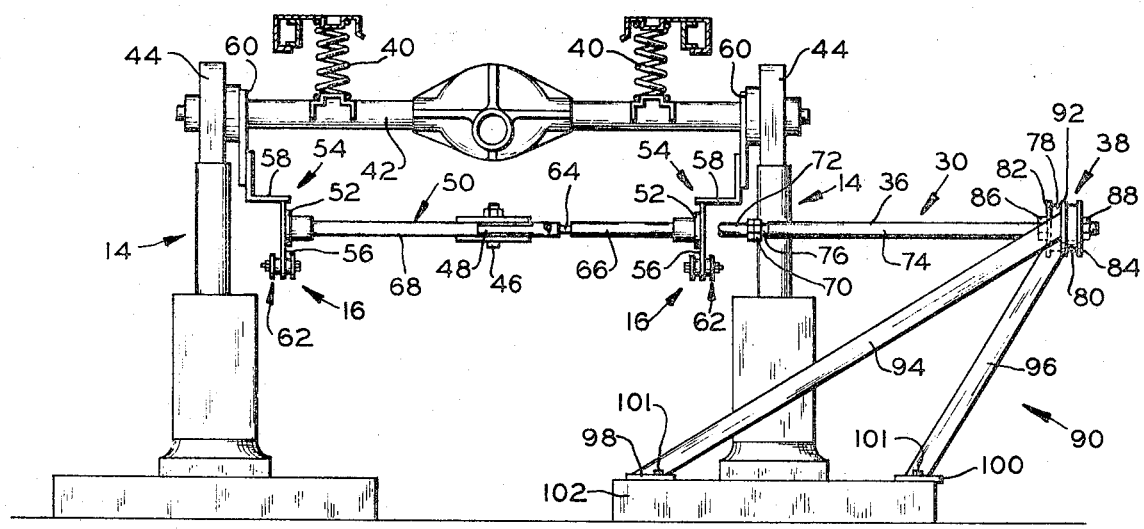
FIG. 4 is a view in sectional elevation taken generally on line 4—4 of FIG. 1 with certain parts removed and showing the lateral force inducing means for a rigid axle.
Figure 5:
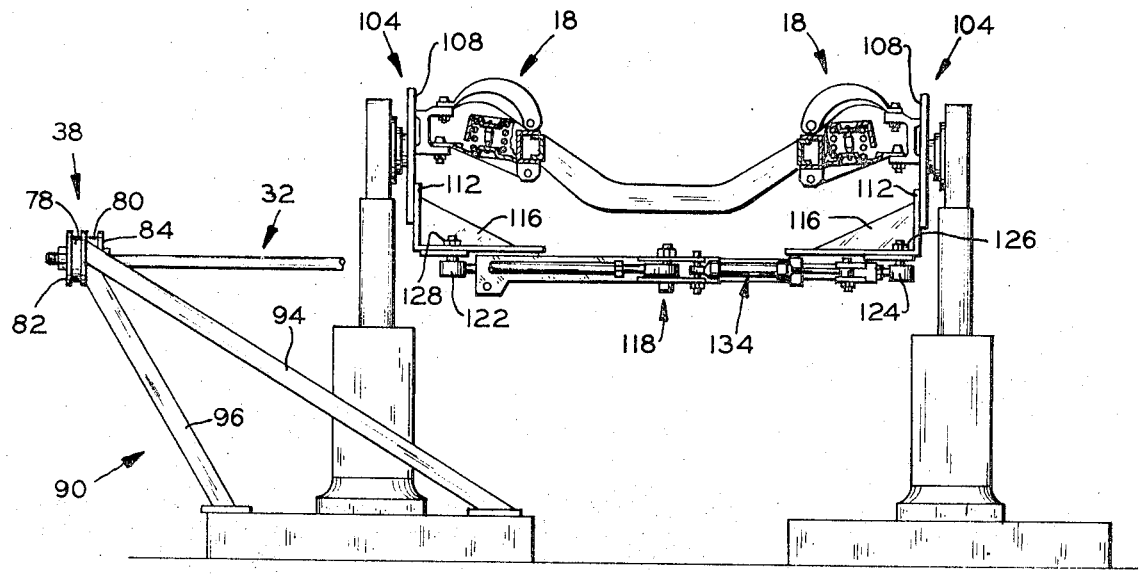
FIG. 5 is a view in sectional elevation taken generally on line 5—5 of FIG. 1 with certain parts removed and showing the lateral force inducing means applied to the front independent suspension.
Figure 6:
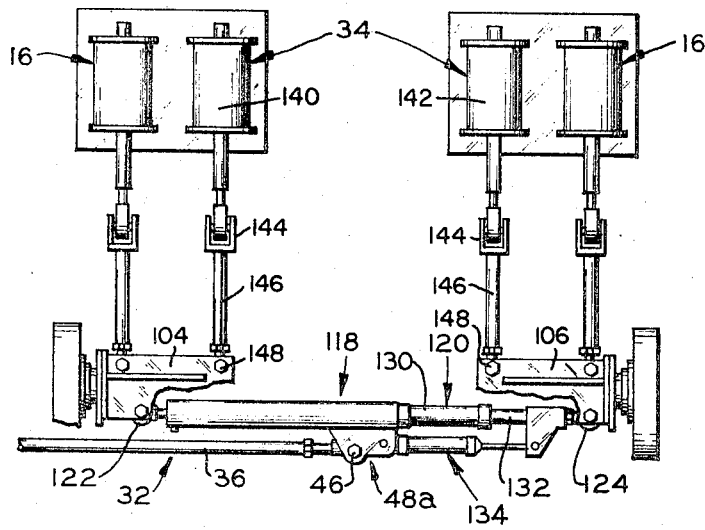
FIG. 6 is a plan view of the front portion of the structure shown in FIG. 1 with certain parts removed for clarity.

The anti-skid means disclosed in my foregoing application is not present in the instant testing machine, having been eliminated by the provision of lateral load inducing means 30 and 32 (FIGS. 3–6) for imparting to the vehicle frame 12 substantially actual lateral loading imposed by "hop" and "tramp." This lateral loading means comprises a solid axle lateral force inducing means 30 (FIGS. 3 and 4) and an independent suspension lateral force inducing means 32 (FIGS. 5 and 6). Additionally, a steering loading means 34 (FIGS. 1 and 6) is provided to the testing machine of the previous application, this means connected to the independent suspension system to simulate the steering forces would be imparted thereto by the steering of a vehicle as it traversed a highway.

Turning now to FIGS. 3 and 4, wherein the solid axle lateral force inducing means 30 is shown as comprising a horizontally extending lateral restraint rod 36 fixed to the vehicular frame 12 proximately along the linear area of the vehicle frame and extending outboard therefrom for connection to the floor of the test building through a resilient means 38. The frame 12, at this end (its rearward end), is supported by a conventional spring means 40 which extends between it and a solid axle 42, this axle being carried at its opposite ends by a pair of fixtures 44 (FIG. 1) such as are disclosed in my aforementioned co-pending application and permit universal rotary, transverse and longitudinal sliding movement of the wheel axle ends. In turn, these fixtures 44 are mounted on the vertical reciprocating means 14.

The lateral restraint rod 36 is pivotally connected at its inboard end on a pivot bolt 46 mounted to a clevis ararngement 48 that is adjustably mounted by bolts or the like (not shown) on a cross tube 50 which is adjustable in length to accommodate various frame widths. The pivot bolt 46 thereby permits unlimited pivotal movement of the lateral restraint rod 36 in a horizontal plane while the distance between the arms of the clevis arrangement 48 permits limited horizontal pivoting of this rod. The cross tube 50 extends generally below and aligned with the solid axle 42 and, at its ends, has a pair of flanges 52, 52 rigidly attached to a pair of brackets 54, 54 extending downwardly from the rigid axle 42. The brackets comprise generally a three piece assembly with the flanges 52 removably attached by bolts or the like (not shown) to a lower plate like member 56 thereof. This plate like member extends upwardly and is fixedly attached by welding or the like (not shown) to a right angle member 58 which, in turn, is attached to another plate like member 60 that is removably mounted by bolts or the like (not shown) to the solid axle 42 adjacent its ends. The brackets 52, 52 below the solid axle 42, are also connected to the torsion means 16, this torsion means being connected below the cross tube 50 to the lower plate like members 56, 56 by clevis connections 62, 62.

The cross tube 50 is adjustable in length to fit various width frames by means of a threaded piece 64 which is threadedly connected to a righthand portion 66 of the cross tube 50 and a lefthand portion 68 of the cross tube 50. In a similar manner, the lateral restraint rod 36 is adjustable lengthwise by means of a nut 70 which is held on a lefthand end portion 72 of the lateral restraint rod 36 by flaring or the like so that the nut 70 is freely turnable thereon. A righthand end portion 74 of the lateral restraint rod 36 includes a threaded extension 76 which threadedly engages the nut 70 so as to be telescopically movable within the lefthand end portion 72 for length adjustment.

As is set out previously, at its outboard end, the lateral restraint rod 36 is provided with a resilient means 38. The resilient means 38 is adjustable so as to provide a varying resiliency and thereby simulate the desired characteristics of a particular tire. The resilient means 38 comprises a pair of rubber pads 78, 80 approximately an inch in thickness which are mounted over the outer end of the righthand end portion 74 of the lateral restraint rod 36. A pair of flange plates 82 and 84 are disposed, one leftwardly of the rubber pad 78, and one rightwardly of the rubber pad 80, while a pair of nuts 86, 88, threadedly received on and adjacent the end of the lateral restraint rod 36, may be tightened towards each other to precompress the rubber pads 78, 80 and provided a desired resilient loading to the restraint rod 36 and thus precisely simulate the action of the tires of a given vehicle traversing a road surface.

The lateral restraint rod 36 is supported vertically at its outboard end by a support means 90 that includes a support plate 92 mounted with the lateral restraint rod 36 intermediate the rubber pads 78, 80, the support plate 92 including a bore (not shown) of sufficient dimension to permit the restraint rod 36 to move laterally thereof dependent entirely upon the compressive force in and imparted to the rubber pads 78, 80. The nuts 86, 88, when tightened against the rubber pads 78, 80, of course, hold the support plate 92 in tightly assembled relationship with the rubber pads 78, 80 and lateral restraint rod 36 to thereby provide the desired precompressed relationship.

In order to hold the support plate 92 in vertical and horizontal position, a pair of diagonally and vertically extending braces 94, 96 are attached to the support plate 92, the brace 94 passing forwardly of the rubber pads 78, 80 while the brace 96 passes rearwardly of these pads. Any conventional rigid connection means such as welding or the like can be utilized to rigidly mount the support plate 92 to the braces 94 and 96. The lower ends of the braces 94, 96 are attached, again by welding or the like, to a pair of base plates 98, 100. These base plates are adjustably connected (longitudinally of the frame) by longitudinally extending slots or the like (not shown) and bolts 101, 101 to a base 102 which forms the mounting arrangement and is a portion of one of the vertically reciprocating means 14. By the arrangement just described a rigid, longitudinally adjustable mounting means is provided for the resilient means 38 which is firmly and positively placed relative to the test floor.

The front end of the vehicular frame 12, because of the independent suspension of the front wheels, is provided with a lateral loading arrangement (independent susupension lateral loading means 32) which differ somewhat from the lateral loading arrangement for the rear of the vehicle frame 12.

A pair of brace assemblies 104, 104 are attached respectively to the leftward and rightward wheel ends of the vehicle independent suspension system 18. These brace assemblies include a pair of flange members 108, 108 which are conveniently attached to the opposite wheel ends and extend downwardly to be rigidly attached to a pair of right angle members 112, 112. A triangular piece 116 is welded to each of the angle members with the right angle portion of these triangular pieces nestingly conforming to the right angle portions of each of the right angle members 112, 112. A cross bar assembly 118 is attached between the right angle members 112 and 112 and is provided with a means such as a slip joint 120 near one of its ends so as to permit and accommodate the varying distances between the brace assemblies 104 as the independent suspension on each side moves relative to the other. The cross bar assembly 118 is attached at its leftward end to the brace assembly 104 by means of a commercial and conventional ball joint 122 thus insuring free movement of the cross brace assembly relative to the suspension 18 at this end of the frame. At its rightward end the cross bar assembly is similarly connected by a ball joint 124 to the rightwardly disposed brace assembly 104. The ball joints 122 and 124 are, of course, conventionally attached to the right angle members 112, 112 by nuts 126 and 128.

In order to permit the aforementioned linear relative movement between the rightward and leftward independent suspension system components, slip joint 120 includes a carrier element 130 into which a telescoping rod 132 is disposed. A linear ball bearing arrangement (not shown) may be disposed within the carrier element 130 so as to provide substantially frictionless sliding motion for the telescoping rod 132.

A clevis arrangement 48a, substantially similar to the previous clevis connection for the rear axle lateral load inducing means is provided intermediate the ends of the cross bar assembly 118. A lateral restraint rod 36 is attached to this clevis arrangement so as to permit unlimited pivotal movement on a vertical axis and limited pivotal vertical movement around the pivot bolt 46 between the upper and lower arms of the clevis arrangement 48a.

The lateral restraint rod 36 is attached outboard of the frame 12 by a similar arrangement as described with reference to the rear portion of the frame 12. More particularly, a resilient means 38 including a pair of rubber pads 78 and 80 and a pair of adjustable flange plates 82 and 84 are disposed vertically above the floor on which the test frame is resting. A support means 90 including a pair of transversely and extending braces 94 and 96 supports the resilient means 38 in a manner similar to the support means 90 previously referred to.

Figure 7:
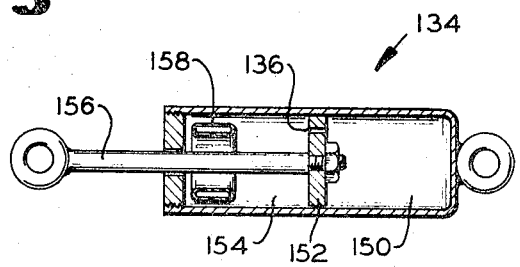
FIG. 7 is a sectional view of the dampening mechanism utilized in this invention.

Attached to the rightward end of the clevis arrangement 48a is a dampening means 134. This damping means is disposed in parallel relation with the slip joint 120 and is provided so as to directly impart the tramp load forces into the suspension system 18 since the slip joint 120, itself, permits completely free collapsing and expanding movement of the cross bar assembly 118 relative to the frame 12. This dampening means (FIG. 7) functions so as to permit extension and retraction movement freely in the passage of very low frequency motions (generally in the vehicle suspension natural frequency range) but which also functions so as to provide an extremely stiff action for the dampening means 134 in the wheel "tramp" frequency range so that laterally induced forces are provided to both sides of the suspension system 18. The dampening means 134, thereby, produces tramp mode shake forces in both the left and right portions of the suspension system 18 but, at the same time, permits normal independent suspension movements to occur in an unrestricted manner.

The dampening means 134 accomplishes the aforesaid functions by the following structure. An orifice 136 is sized so as to permit a relatively unhampered flow, for low frequency motions, of hydraulic fluid from a chamber 150 on one side of a piston 152 of the dampening means 134 to a chamber 154 in which a piston rod 156 of the piston 152 is disposed. Alternately, the orifice 136 also freely permits a backward flow of hydraulic fluid from chamber 154 to chamber 150 at these same low frequency motions. However, at high amplitude motions of high frequency, orifice 136 is of insufficient size to permit the flow of hydraulic fluid therethrough at a sufficiently high rate to accommodate a rapid movement of piston 152 so that the dampening means 134 becomes extremely stiff in action, thereby transmitting the imposed "tramp" frequency loads to both sides of the suspension 18. A sealed bag 158 of compressible plastic material containing Freon or the like is disposed in chamber 154 so as to be compressible and expansible and thereby take into account the differing volumes swept by the piston 152 due to the extending and contracting piston rod 156.

A steering loading means 34 (FIGS. 5 and 6) is also provided to impart steering load forces to the vehicular frame 12. This steering load means comprises a pair of horizontally reciprocating means 140 and 142 which are each pivotally attached to a clevis 134 having a rod extension 146 rigidly connected thereto. The rod extension 146, in turn, is connected by conventional ball joints 148 to the brace assemblies 104 and 106 inwardly of the torsion applying means 16. Each of the horizontal reciprocating means 140 and 142 may then be actuated to provide a steering simulation to the independent suspension system 16 and this steering simulation may be randomly selected or selectively programmed so as to represent, for example, a particular road surface.

It should be clear from the foregoing description that a frame testing machine has been described which fulfills the objects of the invention and has all the attendant advantages thereof. However, it is to be understood that the specific construction described is only exemplary and that other obvious alternatives for fulfilling the same functions as the instant invention will obviously occur to one skilled in the art.

What is claimed is:

1. A test machine for a vehicle frame having an axle and front independent suspension system comprising; (a) a vertical reciprocating means for vertically loading said axle and said front independent suspension system, (b) means for imposing a cyclic torsional loading to said axle and said front independent suspension system, (c) link means pivotally attached to said vehicle frame for imparting an inertia loading thereto, (d) horizontally reciprocating means for imparting steering loading force to said front independent suspension.

2. A test machine for a vehicle frame having a rear axle and an independent suspension system comprising; (a) vertical reciprocating means for vertically loading said rear axle and said independent suspension system, (b) means for imposing a cyclic torsional loading to said rear axle and said independent suspension system, (c) link means pivotally attached to said vehicle frame for imparting an inertia loading thereto, (d) link means attached to said axle and said independent suspension system for inducing tramp loading to said vehicle frame.

3. A test machine for a vehicle frame having a rear axle, suspension means for resiliently connecting the rear axle to the frame, and an independent front suspension system having right and left wheel ends comprising: (a) vertically reciprocating means for vertical loading said rear axle and said independent front suspension system; (b) torsional means for imposing longitudinally of said frame cyclic torsional loading to said rear axle and said independent front suspension system; (c) inertia means for restraining said frame against longitudinal movement; and (d) lateral restraining means for resiliently restraining said rear axle and said independent front suspension system against lateral movement.

4. The test machine of claim 3 and means for imposing steering load force to said independent front suspension system.

5. The test machine of claim 3, wherein said lateral restraining means for restraining said rear axle includes a lateral restraining bar resiliently connected to a stationary support.

6. The test machine of claim 3, wherein said lateral restraining means for restraining said independent front suspension system comprises a cross bar having first and second members freely slidable in an axial direction relative to each other, said cross bar arranged to interconnect said right and left wheel ends, a lateral restraining bar pivotally connected at one end to said first member and resiliently connected at its opposite end to a stationary support, said second member being connected to said restraining bar through a dampening means for permitting relative low frequency movement and restraining relative high frequency movement.

7. A test machine for a vehicle frame having a rear axle, spring means for resiliently connecting said rear axle to said frame, and an independent front suspension system having right and left wheel ends, comprising vertically reciprocating means for vertically loading said rear axle and said right and left wheel ends of said independent front suspension system, first lateral restraining means for resiliently restraining lateral movement of said rear axle and second lateral restraining means for resiliently restraining lateral movement of said right and left wheel ends, said first lateral restraining means comprising a cross bar arranged in spaced parallel relationship to and fixed to the ends of said rear axle and a lateral restraining bar pivotally connected at one end to said cross bar and resiliently restrained at its opposite end.

8. A test machine for a vehicle frame having a rear axle, spring means for resiliently connecting said rear axle to said frame, and an independent front suspension system having right and left wheel ends, comprising vertically reciprocating means for vertically loading said rear axle and said right and left wheel ends of said independent front suspension system, first lateral restraining means for resiliently restraining lateral movement of said rear axle and second lateral restraining means for resiliently restraining lateral movement of said right and left wheel ends, said second lateral restraining means comprising a cross bar arranged in spaced parallel relationship to said wheel ends and interconnecting said wheel ends, said cross bar having first and second members arranged to be freely moveable to each other in an axial direction, a lateral restraining bar pivotally connected at one end to said first member and resiliently fixed at its opposite end to a stationary support, and dampening means interconnecting said second member and said lateral restraining bar for permitting low frequency relative movement between said second member and said lateral restraining bar, and restraining relative high frequency movement therebetween.

9. The test machine of claim 8, wherein said dampening means includes a hydraulic cylinder, a ported piston arranged in said cylinder and having a connecting rod extending exteriorly of said cylinder, and volume compensating means disposed in said cylinder.

References Cited

UNITED STATES PATENTS

| | | | |
|---|---|---|---|
| 2,799,158 | 7/1957 | Federspiel | 73—71.7 |
| 2,890,584 | 6/1959 | Dickie | 73—71.6 |
| 3,106,840 | 10/1963 | Bertsch | 73—91X |
| 3,444,629 | 5/1969 | Ward | 73—11X |
| 3,482,438 | 12/1969 | Toyne | 73—94 |

JERRY W. MYRACLE, Primary Examiner